Nov. 3, 1959  W. A. ALBRIGHT  2,910,708
WATER SLED
Filed Feb. 21, 1955
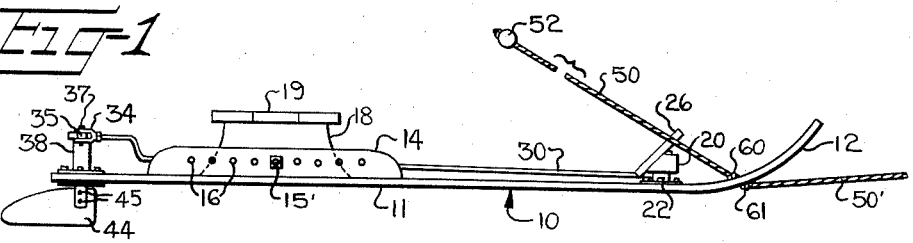
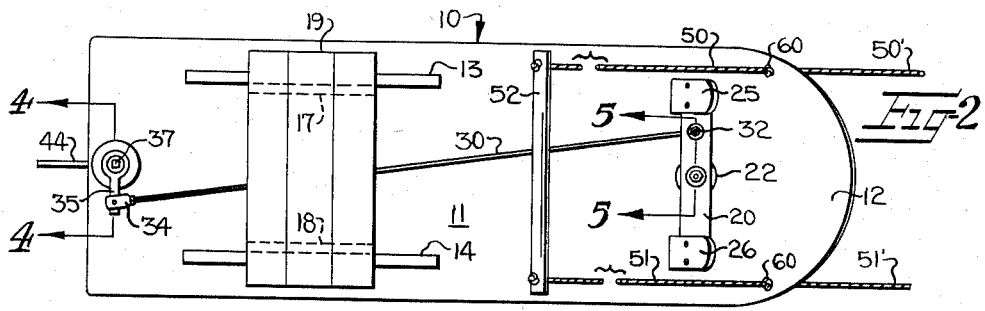
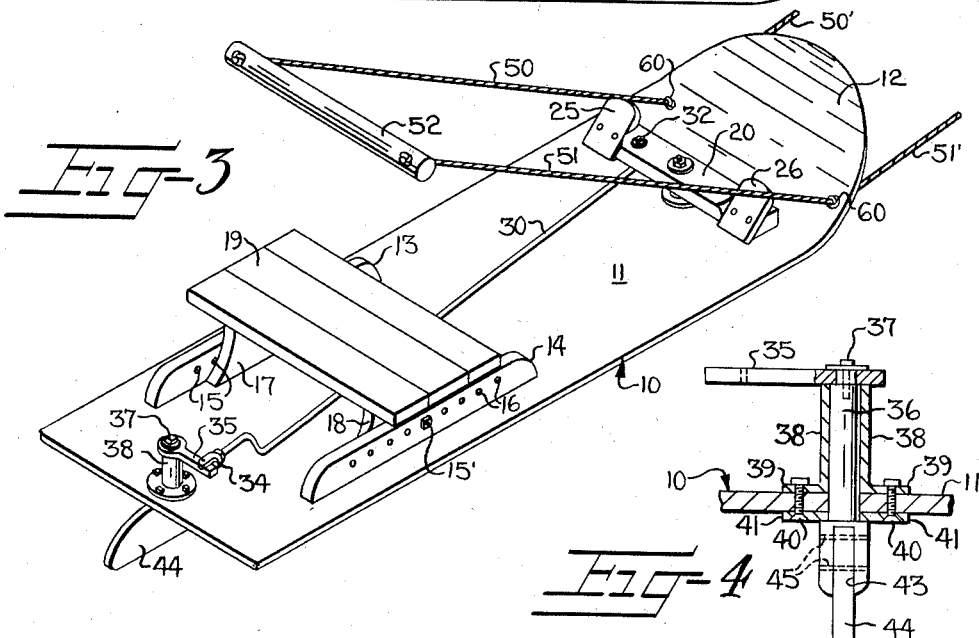
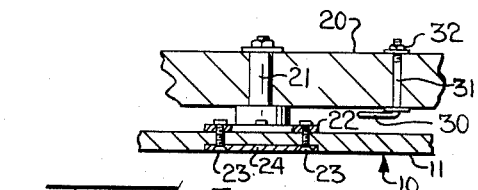
WILLIAM A. ALBRIGHT,
INVENTOR
BY Eaton + Bell
ATTORNEYS

United States Patent Office 2,910,708
Patented Nov. 3, 1959

2,910,708

WATER SLED

William A. Albright, Charlotte, N.C., assignor to Albright Boat & Marine Company, Charlotte, N.C., a corporation of North Carolina Application February 21, 1955, Serial No. 489,654

2 Claims. (Cl. 9—21)

This invention relates to a water sled and more especially, to a water sled designed to be pulled by a motor boat.

It is an object of this invention to provide a water sled with seating means for the rider.

It is also an object of this invention to provide a water sled with steering means controlled by the feet of the rider.

It is a further object to provide tow ropes to pull the water sled with handle means thereon for the rider to hold onto.

Some of the objects of the invention having been state, other objects will appear as the description proceeds, when taken in connection with the accompanying drawings, in which—

Figure 1 is a side elevation of the device;

Figure 2 is a plan view;

Figure 3 is an isometric view of the device;

Figure 4 is an enlarged vertical sectional view taken along line 4—4 in Figure 2;

Figure 5 is an enlarged vertical sectional view taken substantially along the line 5—5 in Figure 2.

Referring more specifically to the drawings, the numeral 10 broadly indicates the sled body having a flat body portion 11 extending substantially over two-thirds of the sled body and having an upturned front end 12 integral therewith. The sled body 10 has a pair of upright elongated seat supporting members 13 and 14 suitably secured on the rear portion thereof which have a plurality of bolt holes 15 and 16 therein. The proximal surfaces of members 13 and 14 are engaged by uprights 17 and 18 on which suitable slats 19 are secured and which serve as a seat for the rider. The uprights 17 and 18 are secured to members 13 and 14 by means of bolts 15', only one of which is shown, but the other of which is identical.

The sled body 10 has a control member in the form of a foot pedal or lever 20 pivotally secured intermediate its ends on an upright stud 21 which has integral therewith a flange 22 which is fastened by bolts 23 to another flange 24 countersunk in the bottom of the sled body 10. The foot pedal 20 has foot pads 25 and 26 suitably secured thereto on which the feet of the rider may rest. There is provided an elongated guide rod or link 30 which has an upturned threaded end 31 (Figure 5) which loosely penetrates the member 20 and is confined thereon by a suitable nut 32.

The rod 30 extends rearwardly and, by means of a bifurcated joint or clevis 34, is pivotally secured to a crank arm 35 which is fixedly secured to the upper end of a stud 36, by any suitable means such as a screw 37. The stud 36 is surrounded by a barrel 38 which is flanged, at 39, and is secured to the sled body 10 by fasteners such as bolts 40 which not only penetrate the body 10 but also penetrate a lower flange 41 on the lower side of the body 10. The stud 36 is bifurcated, as at 43, and holds a rudder 44 therebetween by securing means such as bolts or rivets 45.

The body 10 has attached thereto, as by knots 60 and 61, ropes 50 and 51 which have a handle 52 secured to the rear ends for the rider to hold. The body 10 also has, preferably integral with ropes 50 and 51, tow ropes 50' and 51' which extend forwardly and are shown broken away. The tow ropes are adapted to be suitably secured to a motor boat or other pulling means, not shown, some distance ahead which furnishes the propulsion power for causing the water sled to remain on top of the water during forward motion.

In the drawings and specification there has been set forth a preferred embodiment of the invention and, although specific terms are employed, they are used in a generic and descriptive sense only and not for purposes of limitation, the scope of the invention being defined in the claims.

I claim:

1. A water sled comprising an elongated body having substantially flat upper and lower surfaces with an upturned front end portion, a foot lever normally extending transversely of said body portion and being pivotally mounted intermediate its ends on a vertical axis positioned on the longitudinal axis of said body adjacent the front end thereof, an upright stud journaled on the longitudinal axis of said body adjacent the rear thereof, a single link rod spaced from the upper surface of said body and having its front end portion connecting said foot lever and means connecting the rear end portion of said rod to said stud, said link rod normally extending diagonally across said body whereby the opposite end portions thereof are positioned on opposite sides of the longitudinal axis of said body, a rudder secured to the lower end of said stud and being positioned below said body, and a longitudinally adjustable seat positioned adjacent the rear end of said body and straddling said link rod.

2. A water sled comprising an elongated body having substantially flat upper and lower surfaces with an upturned front end, a foot lever pivotally mounted on a vertical axis intermediate its ends on the longitudinal axis of said body adjacent the upturned front end, an upright stud journaled on the longitudinal axis of said body adjacent the rear thereof, a rudder secured to the lower end of said stud and positioned below said body, a crank secured to the upper end of said stud, a single link rod spaced from the upper surface of said body and connecting said crank with said foot lever, said link rod being diagonally disposed across said body with its opposite ends being positioned on opposite sides of the longitudinal axis of said body, whereby the weight of the link rod is distributed over a wide area of the body, and a longitudinally adjustable seat positioned adjacent the rear end of said body and straddling said link rod.

References Cited in the file of this patent

UNITED STATES PATENTS

| 1,356,013 | Ranlett | Oct. 19, 1920 |
|---|---|---|
| 1,559,390 | Waller | Oct. 27, 1925 |
| 1,793,528 | Szabo | Feb. 24, 1931 |
| 2,187,437 | Wanat | Jan. 16, 1940 |

FOREIGN PATENTS

| 800,650 | France | July 15, 1936 |
|---|---|---|
| 1,008,914 | France | May 23, 1952 |